UNITED STATES PATENT OFFICE.

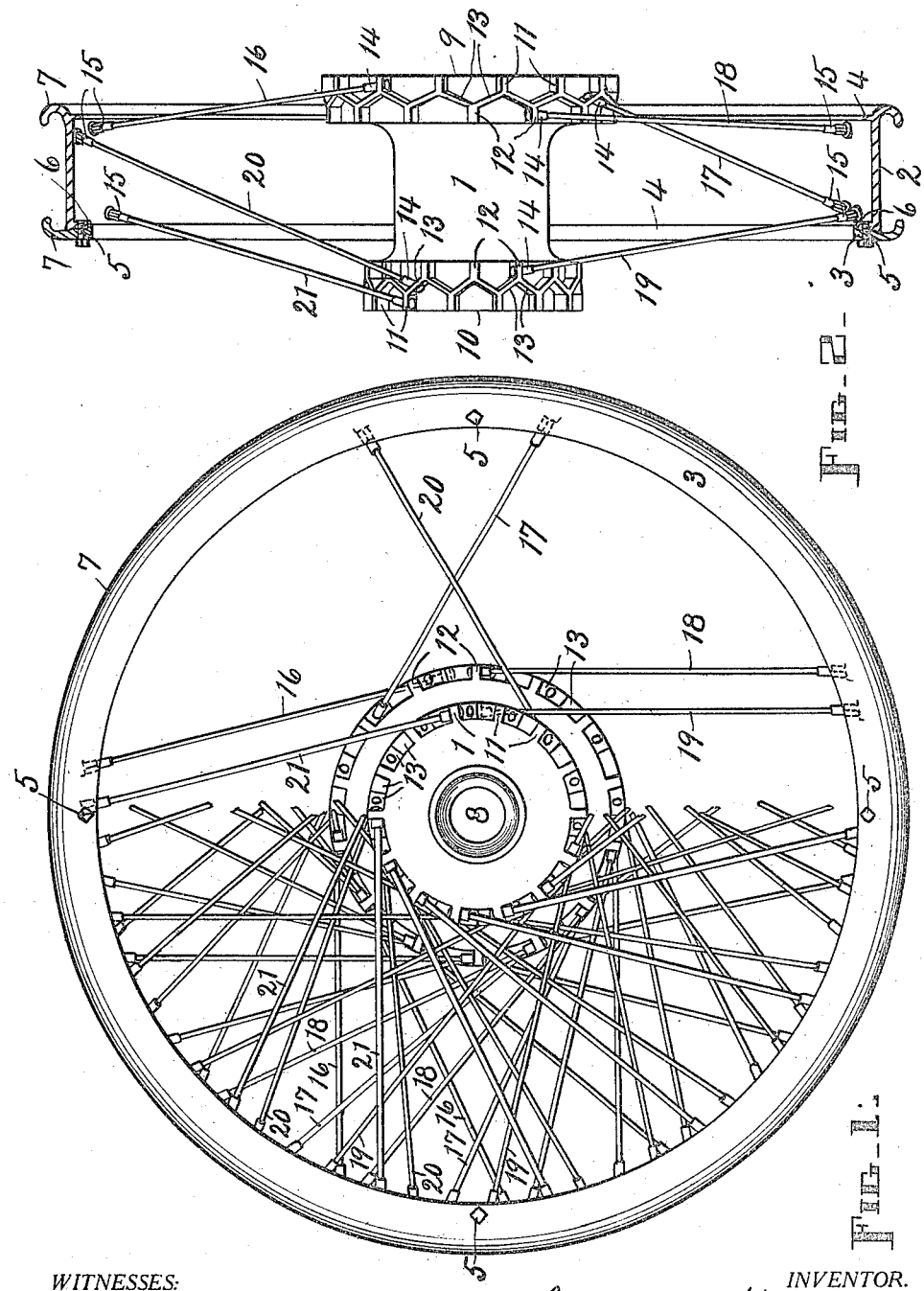

ROBERT M. KEATING, OF SPRINGFIELD, MASSACHUSETTS.

WIRE WHEEL.

1,239,794.  Specification of Letters Patent.  Patented Sept. 11, 1917.

Application filed February 27, 1914. Serial No. 821,531.

*To all whom it may concern:*

Be it known that I, ROBERT M. KEATING, a citizen of the United States of America, residing at Springfield, in the county of Hampden and States of Massachusetts, have invented a new and useful Wire Wheel, of which the following is a specification.

My invention relates to improvements in that type of vehicle wheels commonly known as wire wheels, and resides in a hub of special construction and a certain peculiar arrangement of spokes, all as hereinafter set forth.

The object of my invention is to produce a wire wheel that possesses great strength and powers of resistance to strain and stress in all directions. In other words, this wheel is so constructed that it will not buckle under any reasonable load, and is capable of successfully resisting, not alone peripheral shock, but lateral strain from either side.

A further object is to provide a wheel of this kind that is compact and comparatively light, of good appearance, and withal highly efficient and practicable.

Other objects will appear in the course of the following description.

I attain the objects and secure the advantages of my invention by the means illustrated in the accompanying drawings, in which—

Figure 1 is a front or outer side elevation of a wheel that embodies a practical form of my invention, one half of such wheel being complete, and the other half showing a single spoke only in each set, and, Fig. 2, a side elevation of the hub and a cross-section through the rim, showing again single examples of the six sets of spokes.

Similar reference characters refer to similar parts throughout the several views.

This wheel consists in part of a hub 1, and a rim consisting of a spoke and tire band 2 and a tire ring 3.

The band 2 is provided on the inside, at or adjacent to the edges thereof, with reinforcing ribs 4—4, and bolts 5 are employed to secure the ring 3 to said band, said bolts entering the ring from the outside and being tapped into lugs 6 formed within said band and the outer rib 4. By this means provision is made for removing the ring 3 to permit a tire to be mounted on the band 2, or to be removed therefrom, and for returning said ring to place and securing the same. The band 2 and ring 3 are provided with the usual tire flanges 7—7.

More or less departure from the construction of the rim as herein shown and described may be made, and this is true of the other elements of the wheel, provided, of course, that any such departure or departures are not of such a nature as to exceed scope of my claims.

The hub 1 has a central axle opening 8, and inner and outer peripheral surfaces or rims 9 and 10, respectively, the rim 9 usually being of larger diameter than the rim 10. Each of the rims 9, and 10, is provided with a plurality of projections, flanges, or lugs, divided into an outer series or set 11, an inner set 12, and an intermediate set 13. The lugs in each outer set are in staggered relation to those in the companion inner set, and all of the lugs 11 and 12 are parallel with the axis of the hub 1. Each intermediate set of lugs 13 connects obliquely adjacent ends of the outer and inner sets of lugs 11 and 12 on the same hub rim (9 or 10), or, in other words, each lug 13 is arranged obliquely on its rim, connects the adjacent ends of two adjacent lugs 11 and 12, and forms an obtuse angle with the next adjacent or connecting lug 13 at either end. The obliquity of the lugs 13 and their angular relation to each other are due to the fact that the lugs 11 and 12 fall short at their adjacent ends of the central vertical plane of the hub rim upon which they are located, the lugs 11 falling short of such plane on the outside and the lugs 12 falling short on the inside.

It should here be observed that, as herein employed inner and outer, or equivalent terms, when applied to the wheel as a whole, or to the hub and rim of such wheel, designate respectively that side, end, or edge which would come next to a vehicle body, and that side, end, or edge which would be more remote from such body, were such wheel in operative position; and that the same or similar terms, when applied to the hub rims 9 and 12, or to the lugs thereon, refer respectively to the parts of said rims or the lugs (12) thereon which are adjacent to each other or to the connecting or intermediate part of the hub 1, and to the parts of said rims or the lugs (11) thereon which are most remote from each other or adjacent to the ends of said hub.

The lugs 11, 12 and 13 are provided to serve as points of attachment for the inner or hub ends of wire spokes.

There are six sets of wire spokes in this wheel, one set extending from each set of lugs 11, 12 and 13, at each end of the hub 1, to the band 2, ordinary plain nipples 14 and screw nipples 15 being employed to attach the spokes to said lugs and said band, respectively. Taking the spokes in order, from back to front, that is, from the outer lugs 11 on the inner or rear hub rim 9 to the outer lugs 11 on the outer or front hub rim 10, those in each set are designated by the following numerals—16, 17 and 18, from said rear rim, and 19, 20 and 21, from said front rim.

The two sets of spokes 16 and 21 extend from the outer sets of lugs 11 to the corresponding sides of the band 2, the spokes 16 connecting the rear lugs 11 with said band at points adjacent to the inner or rear edge thereof, and the spokes 21 connecting the front lugs 11 with said band at points adjacent to the outer or front edge thereof. Each spoke 16 forms approximately a right-angle with the radius of the wheel that extends between the wheel axis and the inner end of such spoke, such spoke being therefore in tangential relation to the hub rim to which it is attached, and the same thing is true of every spoke in the wheel. The spokes 16 and 21 extend in the same general direction from the hub of the wheel, and in this particular merge into a single set of pairs.

The two sets of spokes 18 and 19 extend from the inner sets of lugs 12, to the corresponding sides of the band 2, the spokes 18 connecting the rear lugs 12 with said band at points adjacent to the rear edge thereof, and the spokes 19 connecting the forward lugs 12 with said band at points adjacent to the front edge thereof. The spokes 18 and 19 also extend in the same general direction, from the wheel hub, and so merge into a single set of pairs, like the spokes 16 and 21, but the arrangement is such that the general direction of any spoke 16 or 21 is approximately diametrically opposite to that of any spoke 18 or 19 adjacently attached to said hub. This matter of direction is clearly apparent in the drawings. For example, in the right-hand half of the wheel shown in the first view, the two spokes 16 and 21 therein appearing are directed upwardly and the two spokes 18 and 19 are directed downwardly, from their hub ends, although all start from adjacent points. In Fig. 2 the same thing is clearly seen again, and obtains throughout the entire wheel.

The spokes 17 and 20 also extend in generally opposite directions, so that any two which are in approximately the same plane are approximately diametrically opposite in the directions that they take upon leaving the hub rims, as is the case with the other sets of spokes. Each spoke 17 extends from one of the rear lugs 13, crosses the space within the band 2, and is attached to such band at a point which is adjacent to the front edge thereof, and each spoke 20 extends from one of the front lugs 13, crosses the aforesaid space in the opposite direction, and is attached to said band at a point which is adjacent to the rear edge thereof. These spokes may be termed cross-over spokes, because each crosses over from one end of the hub to the opposite side of the rim. On account of the cross-over feature, the spokes 17 and 20 might be considered as a third set of pairs. In the matter of direction, the spokes 17 may be classed or grouped with the spokes 18 and 19, and the spokes 20 with the spokes 16 and 21.

The spokes 17 and 20 are attached to the lugs 13 that are in angular relation to the directions taken by said spokes in crossing the rim space, and, since all spokes 17 have a forwardly direction and all spokes 20 a rearwardly direction, only alternate lugs 13 are utilized as anchorage members, and lugs on both rims 9 and 10 that correspond in general direction, as is clearly shown in Fig. 2. The intervening unutilized lugs 13 add strength to the lug structures on the rims 9 and 10, and the presence of such lugs makes it possible to interchange or transpose the two sets of cross-over spokes in the matter of directions, so that, in making up the wheel, the spokes 17 would cross from the rim 10 to the back part of the band 2, and the spokes 20 from the rim 9 to the front part of said band. Thus it is seen to be immaterial which series of like directed lugs 13 are utilized for the spokes 17 and 20 or their equivalents.

In the complete wheel, a nipple 14 is inserted in an opening in each lug 11 in each of the two sets, with the head on one side of said lug and the neck extending through said lug and beyond the other side of the same, for any of the spokes 16 or 21; a nipple 14 is inserted in an opening in each lug 12 in each set, with the head on one side of said lug 12 and the neck extending through said last-mentioned lug and beyond the other side of the same, for one of the spokes 18 or 19, such last-mentioned side being opposite to that of the aforesaid lug 11 beyond which the nipple neck extends, provided the two lugs in question, 11 and 12, be adjacent to each other or on the same side of an axial plane of the hub 1; and a nipple 14 is inserted in an opening in each alternate lug 13, which has the desired direction, with the head of said nipple on the outside of said lug 13, and the neck of said nipple extending through said lug and beyond the inside face thereof, for one of the spokes 17 or 20. The wheel hub and rim are thus tied together in and braced from all directions. The increased number of spokes, which I am able to use by reason of this construction and arrangement, and their peculiar crossings and positions relative to each other and to the hub and rim of the wheel, enable me to produce a truss effect which in a wheel renders the same very stable, strong and durable, and particularly well adapted for motor-driven vehicles.

The lugs on the hub rims 9 and 10 afford spoke anchorages that are exceedingly strong, they are most convenient for the purposes for which they are designed, and they enable me to use the desired number of spokes.

What I claim as my invention, and desire to secure by Letters Patent, is—

1. A wheel comprising a hub provided with peripheral crosswise lugs in spaced relationship and oblique lugs between a rim, and spokes extending laterally from certain of said crosswise and oblique lugs to said rim, in approximately tangential relation to said hub.

2. A wheel comprising a hub, a single rim, spokes extending between said hub and rim, certain of said spokes being cross-over spokes, and all of said spokes being attached to said rim adjacent to the edges thereof, and means of attachment at said hub for all of said spokes, whereby the latter are retained in approximately tangential relation to said hub.

3. The combination, in a wheel, with a hub having rims provided with outer, inner, and intermediate sets of lugs, the lugs in the intermediate sets being oblique, and a wheel rim, of a set of spokes extending from each of said outer sets of lugs to said wheel rim, a set of spokes extending in a generally opposite direction from each inner set of lugs to said wheel rim, and a set of spokes extending from each intermediate set of lugs to said wheel rim, the spokes extending from the intermediate sets of lugs crossing to opposite sides of said wheel rim.

4. The combination, in a wheel, with a hub having rims provided with outer, inner, and intermediate lugs, and a wheel rim, of spokes extending from corresponding sides of said outer lugs to said wheel rim, spokes extending from corresponding sides of said inner lugs, but relatively opposite to those of said outer lugs from which said first-mentioned spokes extend, to said wheel rim, and cross-over spokes extending from said intermediate lugs to said wheel rim.

5. The combination, in a wheel, with a hub having rims provided with outer, inner, and intermediate lugs, and a wheel rim, of spokes extending from said lugs to said wheel rim, certain of said spokes having one general direction, and certain others of said spokes having another general direction, and the spokes which extend from said intermediate lugs crossing to the opposite side of said wheel rim.

ROBERT M. KEATING.

Witnesses:
A. C. FAIRBANKS,
F. A. CUTTER.